Patented July 2, 1929.

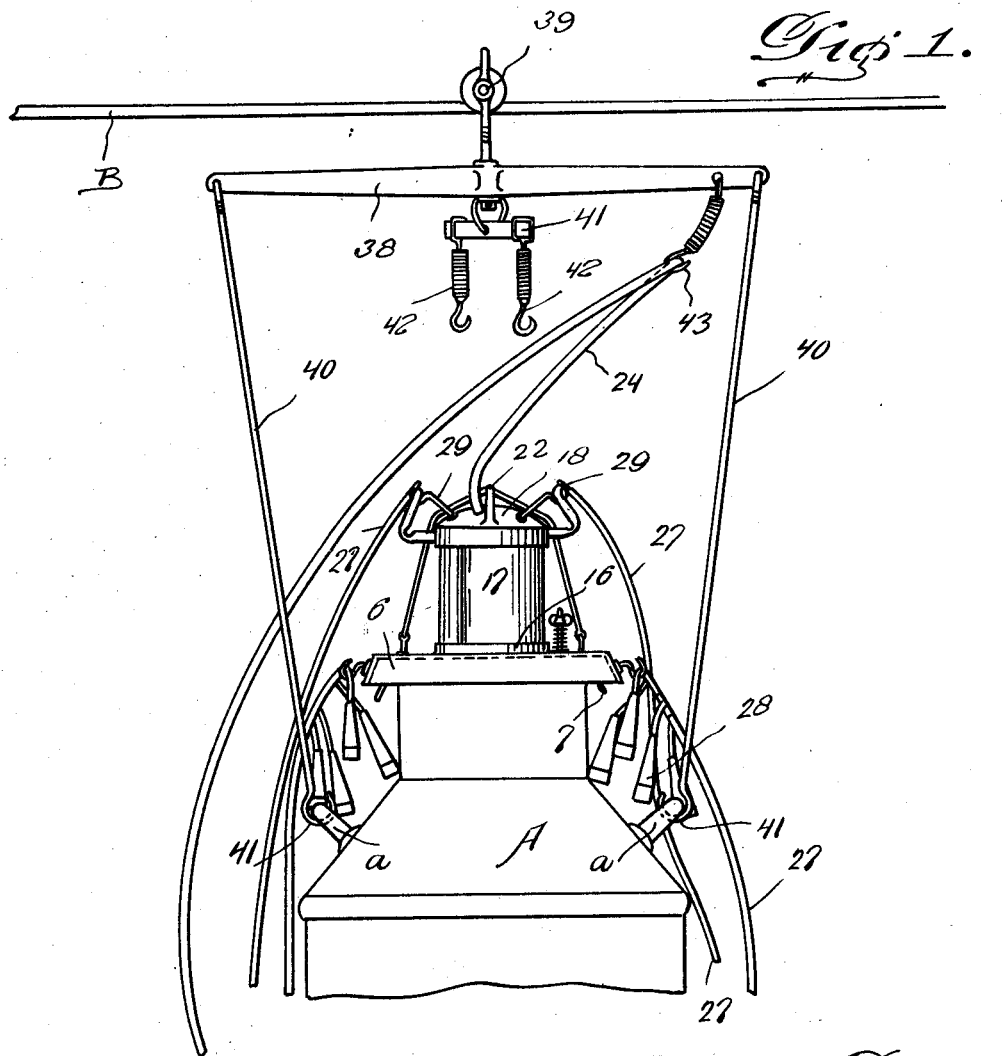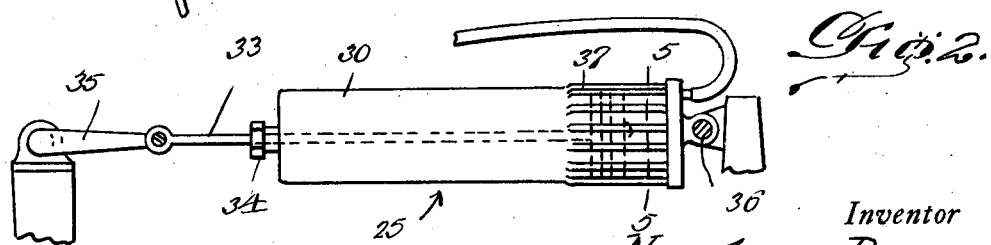

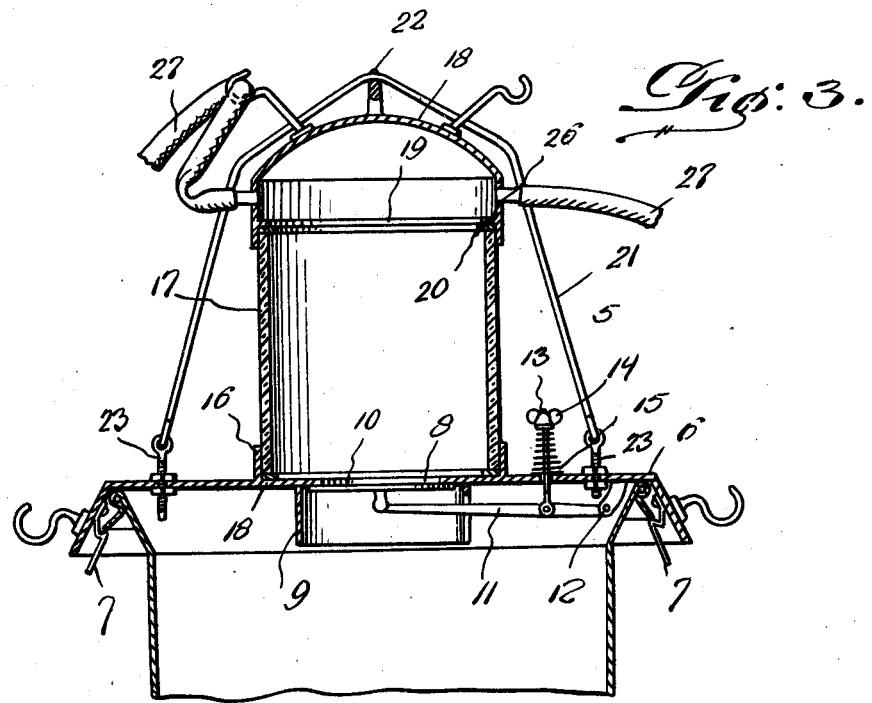
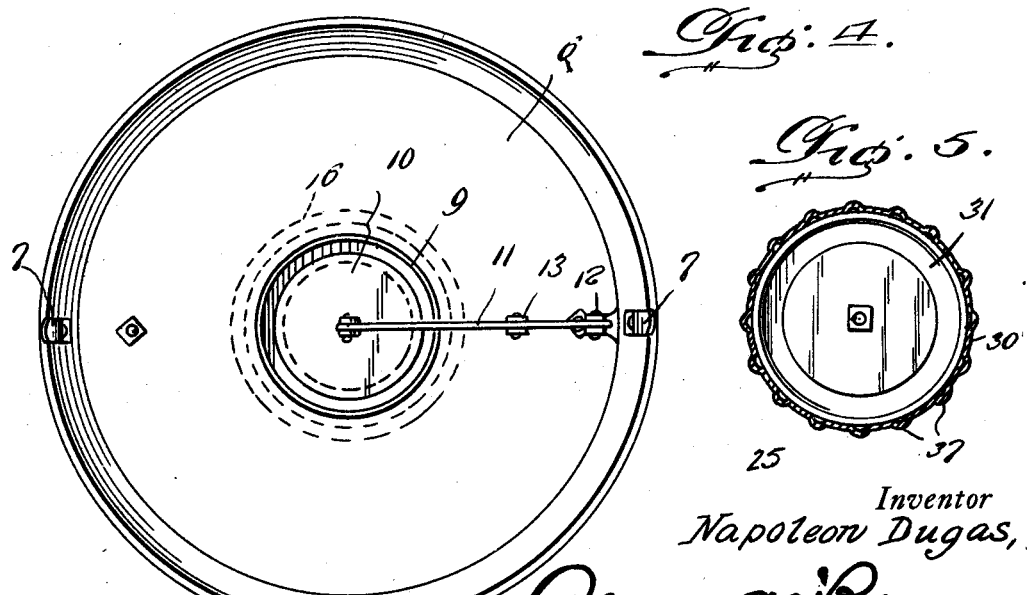
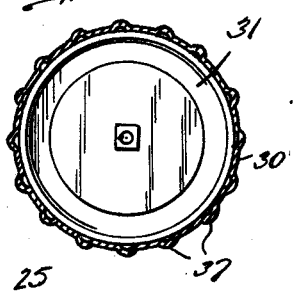

1,719,395

UNITED STATES PATENT OFFICE.

NAPOLEON DUGAS, OF RIPLEY, MINNESOTA.

MILKING MACHINE.

Application filed November 20, 1926. Serial No. 149,675.

This invention relates to new and useful improvements in milking machines, and has for its primary object to provide a device of this character that includes generally a vacuum container constructed for disposition upon a milk can and in communication with which are flexible pipes having teat cups upon their opposite ends for attachment to the teats of cows in order that when a vacuum is created therein, the milk will be drawn from the cows and subsequently passed into the can when the vacuum is broken.

A further and important object is to provide a milking device of this character that may be readily moved from stall to stall, and as readily associated with milk cans that may be positioned adjacent the various stalls so as to permit the cans to be filled direct by the apparatus.

Yet another object is to provide a milking device that is extremely simple of construction, inexpensive of manufacture, and one that may be operated without requiring great skill and without great expenditure.

Other objects will become apparent as the nature of the invention is better understood, the same comprising the novel form, combination, and arrangement of parts hereinafter more fully described, shown in the accompanying drawing and claimed.

In the drawings wherein like reference characters indicate corresponding parts throughout the several views:

Figure 1 is a side elevation of the vacuum device supported for movement upon a rail suitably arranged within the barn, said vacuum device being disposed as positioned upon a milk can and from which are extended teat cup carrying vacuum pipes as well as a vacuum creating pipe in communication with a vacuum producing pump.

Figure 2 is a side elevation of the vacuum producing pump per se.

Figure 3 is a detail vertical section of the vacuum device disposed upon a milk can.

Figure 4 is a bottom plan view thereof, and

Figure 5 is an enlarged transverse section through the vacuum creating pump taken substantially upon the line 5—5 of Figure 2.

Now having particular reference to the drawings, A designates a conventional type of milk can, while B designates a supporting rail mounted in a suitable manner within the barn preferably directly between the stalls at the opposite sides of the barn. The invention per se consists of a vacuum unit designated generally 5 constructed for disposition upon the neck of the can A and consisting of an inverted can shaped base plate 6 provided at the inner side of its rim portion with spring clips 7 for engaging beneath the usual depending circumferential flange at the upper end of the can neck for maintaining said base plate in tight engagement with the neck of the can as clearly disclosed in Figure 3. This base plate is formed at its center with a circular opening 8 surrounded on its under side by a depending collar 9 and within which is movable a circular valve plate 10 for normal engagement with the under side of the opening for maintaining the same closed. This valve plate 10 is carried upon the inner end of an arm 11 that is pivoted at its outer end to the under side of the base plate as at 12. Extending upwardly from this arm is a long pin 13 that engages through an opening in the base plate and has mounted upon its upper end which is threaded a wing nut 14. Between this wing nut and this base plate is an expansible conical spring 15 for the purpose of pulling upwardly upon the arm 11 so as to normally maintain said valve plate 10 in closed position.

Surrounding the opening 8 in the base plate 6 at the top side thereof is a circular collar 16 within which is disposed the lower open end of a cylindrical container 17 preferably of glass or other transparent material between which and said base plate is a packing ring 18. Disposed upon the upper open end of this container 17 is a dome shaped lid 18 formed internally with a circumferential flange 19 that rests upon a packing ring 20 interposed between the flange and the upper end of said container, said container and lid providing a vacuum chamber as hereinafter more fully described.

The lid 18 is securely maintained in position upon the container by any suitable means, but by way of illustration this means is disclosed as consisting of a metallic bail 21 extending at its bight portion through the eye formed in an ear 22 upon the center of the lid 18, the opposite ends of this bail being also eyed for connection with the eyed ends of eye bolts 23—23 that are extended through and suitably secured to the pan-like base plate 6.

Communicating with the interior of this vacuum chamber through an opening in the top side of the lid 18 of the container 17 is a flexible hose 24 that is in communication at its opposite end with a vacuum creating pump designated generally 25 in Figure 2. Leading from the side wall of the lid 18 are a predetermined number of nipples 26 to which are attached the inner ends of the flexible pipes 27, the opposite ends of the same being equipped with one or more teat cups 28, see Figure 1. The pipes being of such a length as to permit the cups to be readily applied to the teats of the cow udders. The teat cups are of conventional construction, and therefore a detailed illustration and description is not believed necessary. In order that these flexible pipes may be cut off from communication with the interior of the vacuum chamber supporting hooks 29 are associated with the container lid 18 and obviously by engaging the pipes within the hooks as indicated in both Figures 1 and 3, the pipes are compressed directly outwardly of the ends of the nipples 26.

The vacuum pump as illustrated in Figures 2 and 5 consists of an elongated cylinder 30 closed at its opposite ends and within which is rectilinearly movable a piston 31 attached to a rod 33 that extends through a bushing 34 at the inner end of the cylinder and that is operatively attached to a suitable actuating means such as a motor controlled crank arm 35. The opposite end of the cylinder 30 is pivotally attached as at 36 to a suitable support so that said cylinder may properly oscillate. This vacuum pump is mounted preferably upon the wall of the cow barn or at any other desirable point, the same having communication at its forward end with the flexible hose 24 as clearly disclosed in Figure 2.

At the forward end of the cylinder 30 the same is formed circumferentially with longitudinally extending spaced corrugations 37 that provide air channels for establishing communication between the opposite ends of the cylinder 30 when the piston 31 is within the forward end of the cylinder, also as shown in Figure 2 and for a purpose hereinafter described.

Obviously after the teat cups 28 have been properly applied to the teats of the cow's udders, and the suction pump operated, a vacuum will be created within the vacuum chamber upon the milk can when the piston of the pump moves in a direction toward the left in Figure 2. The vacuum created within the chamber will obviously suck the milk from the udders of the cows whereupon the same will enter said vacuum chamber. Upon the return stroke of the piston, a pressure will be created in the vacuum chamber for forcibly moving the valve plate 10 to open position so as to permit the milk to enter the can A. As soon as the piston 31 reaches the forward end of the cylinder, the vacuum in back of the piston will be broken, and the pressure will then be released within the vacuum container whereupon the valve plate 10 will automatically move to closed position so that the operation may be repeated.

In order that the hose attached vacuum chamber may be moved from stall to stall, there is provided a yoke bar 38 to the center of which is swivelly attached a vertically extending roller carrying bracket 39, the roller of which is guided upon the rail B. Depending from the ends of this yoke bar are rods 40—40 the ends of which are hooked as at 41—41 to facilitate the attachment of the rods to the usual handle members a—a of the milk pan A. Suspended from the center of the yoke bar is a cross bar 41 upon the ends of which are spring suspended hooks 42 upon which the teat cup carrying pipes 27 may be hung to take up the length of the pipe when the cows being milked are directly adjacent the device. At the end of the yoke bar 38 is a similar spring suspended hook 43 upon which the vacuum hose 24 may be supported for taking up slack therein when the machine is in close proximity to the vacuum creating pump.

It will thus be seen that I have provided a highly novel, simple, inexpensive and efficient operating milking machine that is well adapted for all the purposes heretofore designated, and even though I have herein shown and described the invention as consisting of certain detail structural elements it is nevertheless to be understood that some changes may be made therein without effecting the spirit and scope of the appended claim.

Having thus described the invention, what I claim as new is:—

In a milking machine of the class described, having a chamber open at its respective ends and constructed for disposition upon the open upper end of a milk can, a lid for the upper open end of the chamber, means for alternately creating a vacuum and a pressure in the chamber, milk conveying pipes in communication with the chamber through the lid, whereby milk is drawn into the chamber when a vacuum is presented therein, a valve associated with the open bottom of the chamber for discharging the milk from the chamber into the milk can when pressure is introduced into the chamber, said valve normally closing the open bottom of the chamber, the combination of stationary hooks extending upwardly and outwardly from the lid above the connection of the milk conveying pipes with the lid, said pipes adapted for engagement with the respective hooks to provide a means for cutting off the flow of milk through the pipes into the chamber.

In testimony whereof I affix my signature.

NAPOLEON DUGAS.